United States Patent Office 3,652,461
Patented Mar. 28, 1972

3,652,461
CARBON BLACK DISPERSIONS, THEIR PREPARATION AND PRODUCTS THEREFROM
Harold R. Dalton, 931 Rydal Road, Jenkintown, Pa. 19046
No Drawing. Continuation-in-part of application Ser. No. 502,614, Oct. 22, 1965. This application Nov. 10, 1969, Ser. No. 875,591
Int. Cl. H01b 1/06; C08h 17/08
U.S. Cl. 252—511
17 Claims

ABSTRACT OF THE DISCLOSURE

A dispersion of carbon black particles is dispersed, and has on their surfaces as an adsorbate a mono-layer of an organic resin adsorbed from its solution, in a readily volatile organic solvent for the resin. The solvent and the adsorbate are compatible with (a) solvent used for making with a film-forming resin (differing from the adsorbate) a solution for preparing an electric-signal-responsive film for a recording blank, and (b) the film-forming resin. The dispersion is prepared by (i) milling the carbon black particles with solution of the organic resin adsorbate in its solvent and (ii) until a smooth dispersion of the particles in the solvent results and a mono-layer of the adsorbate is adsorbed over the particle surfaces. The quantity of adsorbate in the solution is at least sufficient to enable a mono-layer of it to be adsorbed on the surfaces of the carbon black particles.

---

This application is a continuation-in-part of co-pending application Ser. No. 502,614, filed Oct. 22, 1965, now abandoned.

This invention is that of producing electric-signal-responsive film-producing suspensions which provide electric-signal-responsive recording blanks having enhanced electric-signal-recording characteristics. The enhanced electric-signal-recording characteristics of the recording blanks result from producing the aforesaid film-producing suspensions according to the invention by an improvement in the method of making them, including a specific combination of steps to provide a modified carbon black dispersion for admixture in a solution of the continuity-structure-providing film-forming resin in a readily volatile solvent for it.

The improvement is in preparing said film-providing suspension by a method including the combination of steps comprising (a) milling (i) a quantity of carbon black particles suitable for use in the film to be produced, with (ii) a quantity of a solution of an organic resin (to serve as an adsorbate onto the surfaces of said carbon black) in a readily volatile organic solvent for that resin, and (b) continuing the milling until a so-called smooth dispersion of the carbon black particles in the solvent is attained and a mono-layer of the resin adsorbate is adsorbed over the surfaces of the carbon particles.

It is advantageous that the adsorbate resin differ from the resin to be used in making the film-forming resin solution. The quantity of the resin adsorbate in the solution of it is at least sufficient to enable a mono-layer of the adsorbate to be adsorbed on the surfaces of the quantity of carbon black particles used. The adsorbate resin and the readily volatile solvent for it should be compatible with the film-forming resin used and also with the organic solvent used for dissolving it and also compatible with any other constituents, such as a plasticizer or stabilizer, used with that resin.

Thus, the process aspect of the invention is a two-stage method for preparing the carbon black-containing film-providing suspensions used to provide an electric-signal-responsive film, coating, or layer for such products as recording sheets, stencils, printing screens, as well as for such unsupported electric-signal-responsive films, and also films with embedded fibrous material in the form either of fibers alone, or of fibrous proucts such as paper, cloth, screen material, and the like.

The invention includes also the resulting carbon black dispersions for use in preparing the aforesaid suspensions as well as these suspensions for providing the aforesaid coatings or layers and particularly those of the high resistance type and constituting the major thickness of the recording blank or electric-signal-responsive stencil, as well as in such coatings applied onto a backing which may be an electrically conducting paper or film, metallic foil or high electrically conducting coating. This latter coating is the type which functions only to carry the recording current to the grounding strip or drum of a facsimile receiver with as little energy loss as possible.

The method of the invention is referred to as a two-stage method because by it the improved suspension containing the modified carbon black dispersion is prepared in two essential stages. In its first stage, the carbon black particles are milled with a small amount of a solution of a resin (alone or with some other adsorbate, as further below explained) in its readily volatile solvent wherein the quantity of resin (alone or with any other adsorbate) is at least sufficient to apply a so-called mono-layer (as later below defined) of it over the surfaces of the carbon black particles. The indicated result thereof is such strong adsorption of the adsorbate resin on the carbon black surfaces that attempts to remove any significant amount of the resin, as by solvent extraction, were unsuccessful.

The second stage involves dispersing these so-called mono-layer-resin (adsorbate)-coated carbon black particles of a continuity-structure-providing film-forming resin in solution which, when dried, leaves the resulting film, layer or coating with the physical properties needed for the various operations through which the so coated product will be handled in its use.

Broadly considered then, the process of the invention is a two-stage method for making an improved carbon black dispersion-containing suspension (for use in preparing electric-signal-responive films for the type of ultimate products mentioned herein), in which method the solvent and any excess resin (alone or with any other adsorbate) dissolved in said solvent over that which will be adsorbed as a mono-layer on the carbon black particles in the first stage have to be compatible with the constituents of the film-forming resin solution prepared in the second stage.

That solvent and dissolved resin adsorbate also are so proportioned to the latter constituents for the second stage solution that when it and the carbon black dispersion are admixed and thus become the (finished carbon black-containing coating-providing or) electric-signal-responsive film-providing suspension, the electric-signal-responsive film remaining after evaporation of the solvent vehicle contains the planned concentration of mono-layer-resin-coated carbon black substantially uniformly incorporated throughout the dried, set or fixed coating with adequate adhesion, flexibility and strength.

U.S. Pats. 2,555,321, 2,664,043, 2,664,044, and others show that for the type of recording blanks or stencils responsive to electrical signals such as telefacsimile, telegraph signals, and the like, applied by use of a single stylus or multiple styli, the preparation of the prior art carbon black dispersions for use in making the suspension for providing the electric-signal-responsive coatings or films was "not limited to any particular method of preparing" (from Pat. 2,664,043, column 6, lines 8–9).

Such prior art recording products having the electric-signal-responsive coatings as then available perform satisfactorily for most of the ordinary purposes. However, they cannot enable recording at very high speeds.

Moreover, the resolution provided by their recorded electrical signals is unsatisfactory and inadequate to enable their use in exacting applications such as silk screen printing and electrostatic printing.

Thus, the prior art electric-signal-responsive films or coatings lack much that might be desired. For example, it can be considered that it should be possible to record transmitted electrical signals at the rate of about 10,000,000 (ten million) signals per second. Yet the prior art products can record such signals with acceptable resolution only at the rate of about 10,000 (ten thousand) per second.

One of the sources for this vast restriction and difference in results resides in the vibration mechanically induced in the recording stylus by the unevenness of the contacted adjacent surface of the coating on the prior art recording blank or stencil which during the recording process is moved past the stylus at a speed of about 50 inches per second.

However, when in the steps preliminary to this invention an apparently smooth coating surface was provided, it occurred that only a slight but not measurable improvement could be noted in gaining either better resolution or higher recording speed. This indicated further that there were involved other factors which continued to prevent attaining maximum efficiency.

Continuing the study leading to this invention showed that the carbon black dispersions of the prior art methods varied widely with milling time or temperature reached by the dispersion during milling. Then also, even on obtaining a uniform dispersion, as shown by apparent absence of graininess, it occurred that with as little as even a few minutes of overmilling or if the dispersion reached a temperature much above 80° F., the recording blank or stencils made with a coating from it gave poor resolution even at extremely low recording speeds.

Even with using extreme care in the milling process of the prior art, conveniently called the "bulk" or "all-in-one" milling (because all of the carbon black is milled in all of the resin solution as a whole at one time), the results vary from batch to batch because of milling conditions that vary only slightly but yet significantly with each milling. Then also, adequate control over the milling of each batch is practically impossible to attain.

It also occurs that the different types of carbon blacks used in making the prior art (i.e. bulk milling) dispersions could give vastly different results.

For example, some carbon blacks showed rapid changes in their milling characteristics which were manifested when the resulting dispersions were used to make films for a recording blank or stencil. That is due largely to the relative ease with which some carbon blacks and resins form dispersions which are difficult to control precisely in the prior art bulk or all-in-one milling operation, whereby available properties of the finished coatings or films cannot be reproduced repeatedly.

The foregoing difficulties strikingly show that the preparation of the carbon black dispersions is a problem of utmost importance in the way of approaching what should be theoretically possibly attainable resolution and speed in using electric-signal-responsive recording blanks.

It is also found that signals applied to the prior art stencils to produce about 40,000 perforations per square inch (i.e. at 200 lines per inch and 200 voltage impulses per inch) with a voltage of about 300 volts on the stylus, produced an open area of about 15% to 18% with at least about 60% tensile strength reduction after perforation. Such reduction shows considerable electrical and thermal breakdown damage around the perforated area of the film. Open area is the ratio of perforated area produced during a recording to the total area before that produced during a recording to the total area before that perforation, as measured with a photoelectric photometer.

In addition, with stencils and recording blanks and similar products embracing electro-responsive coatings made with the prior art bulk or all-in-one carbon black dispersions, at increasing and high voltage recording or breakdown conditions the films show very erratic perforation or signal marking. However, corresponding films made with the two-stage carbon back-containing film-providing suspensions according to this invention, under the same conditions of breakdown give smooth uniform response as the recording or breakdown voltage is increased.

That feature of the invention is evidenced quite sharply in comparative recording of the test gray scale in stencil films, with the stylus voltage for recording the black being adjusted to a high level. On the stencil film with a responsive layer made with a prior art carbon dispersion, the black portion of the gray scale records only partially (due to erratic hole formation). However, the gray scale is recorded precisely, even in its black portion, by the stencil film having the two-stage carbon black dispersion hereof.

Thus, another and principal feature of the invention is that it provides carbon black dispersions that enable preparing such recording blank products as recording sheets, stencils, printing screens, electrically conducting films, and their like, free from the above noted and other disadvantages due to films wherein the heretofore available carbon black dispersions were used. The resulting recording sheets, stencils, printing screens, and conducting films stem from this invention. Other features and advantages of the invention will be apparent from the detailed description of it below.

The two-stage carbon black-containing suspensions of the invention enable providing repeatedly excellent recording sheets, stencils, printing screens, unsupported films, and the like recording blanks which in responding to electrical impulses give resolution which is from at least equal, to significantly superior, to those heretofore available, and at recording speeds as high as 100 inches per second and recording signals at the rate of about 60,000 per second with 300 volts across the stylus. Such improved products are a valuable part of this invention.

It is indicated shortly later below as to the first stage of the method that the mono-layer-providing resin adsorbate may be replaced in part by some other adsorbate to provide the mono-layer to be adsorbed on the carbon black. However, the resin quite likely may be used more often alone for that purpose.

Thus, the quantity of the selected carbon black to be used for making a planned batch of the final film-providing suspension first is milled with an amount of the resin alone or with any other adsorbate, as dissolved in a suitable solvent for it, at least equal to, and advantageously in excess of, that quantity of adsorbate which forms a mono-layer over the surfaces of all of the carbon black particles. The milling of the resulting mixture is continued until a smooth dispersion, that is to say, free of graininess as further below described, is formed.

As to what is a mono-layer, from considerable earlier work on adsorption of elastomers, e.g. butadiene-styrene (75 to 25 ratio) cold rubber, on carbon black, it may be said in a relatively general vein that a mono-layer, as an approximate average of the earlier work indications, is about 140 angstroms thick with a weight ranging from about 20 to 260 milligrams per gram for a fine thermal (i.e. FT) carbon black of surface area 17 square meters per gram (EM, i.e. by electron microscope) to a superabrasion furnace (i.e. SAF) carbon black of surface area 123 square meters per gram (by EM), respectively.

Thus, it is advisable to use excess resin alone or with any other adsorbate over that needed for a mono-layer because the exact quantity for such a layer cannot be readily precisely calculated. It varies with the specific carbon used and, in general, is in proportion to its surface area, and can be approximated by determining the adsorption isotherm for the particular resin or other adsorbate, as seen in "Interfacial Phenomena" by J. T. Davies and E. K. Rideal, Academic Press, New York, N.Y. (1963).

In any event, an excess of the resin is an advantage because it serves to reduce the required time for milling the carbon black in the resin solution. Thus, an excess of even 20 or 30 or more times the indicated quantity needed for a mono-layer can be used so long as the excess is not too extensively higher than such multiples as to interfere with the desired or required physical properties of the dried coating or film left on the finished product such as a recording blank, stencil or unsupported film.

That the mono-layer of resin cannot be significantly removed from the carbon black even by solvent extraction shows that that layer has so modified the carbon black to give it many advantageous properties. For example, heating the mono-layer-coated particles suspension to any temperature below the boiling point of the solvent for the resin and any other adsorbate, and even relatively long milling during this first stage, no longer has any detrimental effect.

Also use of excess resin over that needed for a mono-layer, so long, as is mentioned above, it is not so great an excess as to effect adversely the physical properties of the film or coating or the properties of the finished product made with it, results only in shortening the adsorption time for applying the mono-layer over the carbon black. That time is relatively short, possibly in the range of about an hour or two especially when using the polymeric resin for the mono-layer. However, to assure avoiding graininess in the final film-providing suspension, it is desirable to have a combined milling time, say, of about five hours or more.

The initial mono-layer-applying stage also so modifies the carbon black and, in turn, any finally completed suspensions made with such carbon black that the resulting films then used in recording blanks such as recording sheets, stencils, printing screens, etc. or merely as unsupported films, provide in them greatly enhanced recording characteristics as indicated above. These also appear to be identified with the type of resin or included other adsorbate in the mono-layer on the carbon black.

Also as part of the invention it was found that other substances, such as plasticizers, e.g. di-(2-ethylhexyl) phthalate, or stabilizers (e.g. organic phosphates), for the resin or other ingredients for the film, or dispersing agents (e.g. the "Triton X-45" alkyl aryl polyethoxy alcohol, or fluoro- or silico-substituted organic surfactants, and any others) used for and compatible with any of the ingredients for such films, and still other substances which may be used as ingredients in preparing such films, e.g. resin monomers and other compatible organic substances such as dyes, for example, rose bengal and others, and dye sensitizers, any of which is soluble in the solvent to be used in the mono-layer adsorption step, can be used with the resin adsorbate on the carbon black.

Including any such other substances as adsorbates with the resin in making the mono-layer provides in the final conductive film-supplying suspension characteristics based respectively on them. Thereby recording blanks such as recording sheets, stencils, unsupported films, and the like show recording properties which also stem from use of any of these other materials along with the resin adsorbate. Different characteristics are required for a non-strippable blank than for a strippable blank.

It is common in the art, for determining optimum milling conditions for the bulk milling process of dispersing a particular carbon black in a resin solution, after a certain milling time, to draw periodically separate samples of the dispersion and to test for graininess; and after overcoming that, even to test the coating for its recording characteristics.

So also when the resin as a single absorbate is, or along with any of the shortly above indicated other substances as a plurality of adsorbates are, to be used in the initial mono-layer forming stage of this invention, tests also may need to be made involving preparing a number of coating films for a stencil or other recording blank from an electric-signal-responsive film-producing suspension made with an initial mono-layer-adsorbate-coated carbon black dispersion using the particular resin adsorbate alone or along with any of said other substances as a plurality of adsorbates, so as to note the respective recording behavior and reach a choice for final production for the desired purpose.

Electrical conductivity is important in a coating or film. It can be determined by usually used measuring means. The distribution of carbon black in the same coating or film is of equal importance. This property has to be determined by following this last noted test procedure in order to examine and judge the obtained recording.

It has been found that when the resin along with any of said other substances as a plurality of adsorbates are used in the initial mono-layer forming stage, only one appears eventually to form the mono-layer. The substance or substances not adsorbed will remain in solution to modify the dispersion in various ways; for instance, if a resin and a high molecular weight dispersing agent constitute the additives to the solvent used in the first stage, both may be adsorbed partially in the early stage of the adsorption process. However, at equilibrium the resin probably would form the mono-layer with the dispersing agent functioning to modify the carbon black distribution in the dispersion. A resin monomer may not be adsorbed in the final part of the adsorption step, but under some conditions, e.g. heat, type of monomer, may act to form cross-links between mono-layers on the individual carbon black particles.

In any event, the resin used in the first stage, being different from the one used in the second stage, and any other of the aforesaid substances used along with it as adsorbate, when used in excess must be compatible with the resin and solvent constituents of the second stage film-forming resin solution, and so also as to the solvent used in the first stage.

The production of a recording stencil like that disclosed in the U.S. Pat. 2,664,043 or a recording support or blank as shown in U.S. Pat. 2,040,142 shows that some of the properties which the formulation used in the second stage of the method has to provide in the final product, such as a recording stencil or recording film, are stability in handling, strength to endure printing or duplicating operations, resistance to printing ink vehicle and to solvents used to clean a stencil or screen for storage purposes, etc.

The continuity-structure-providing film or coating layer of this invention can be made from a solution of any of the widely available number of pliable-film-forming resins such as the synthetic resins and elastomers, for example, vinyl chloride polymers and copolymers, the polyvinyl resins such as vinyl chloride-acetate copolymers, and vinylidine chloride polymers and copolymers, methacrylate polymers or copolymers or mixtures of them, styrene polymers and copolymers, polycarbonates, polysulfonates, high strength elastomers, and the like.

The continuity-structure-providing resin solution to be admixed with the first stage carbon black dispersion can be made by dissolving any such film-forming resin in a solvent suitable for it and compatible with the solvent in the first stage dispersion, and using heat to enhance dissolving the resin if needed. Suitable plasticizers, stabilizers, fillers, dyes, and the like can be included to modify the final properties of the final layer to be provided by the overall resin solution. In such case, ball or roll milling can be used to enhance thorough solution and blending of the resin with any insoluble filler of such added materials.

Then as the third and ordinarily last step in preparing the electric-signal-responsive film-providing suspension or finished carbon black-containing coating suspension, the initial stage mono-layer-resin-coated carbon black dispersion is admixed with the continuity-structure-providing resin solution of stage two, either by agitation or ball milling for the short time sufficient, possibly only 15 or 20 minutes or so, to provide a uniform finished carbon black-containing coating suspension. This electric-signal-responsive film-providing suspension can be used or applied as disclosed in any of the above identified patents.

Typical illustrative, but not to be taken as restricting, examples of the first stage resin solution dispersion of mono-layer-resin-coated carbon black, are as follows (with the ingredients being in parts by weight):

EXAMPLE 1

The following ingredients were milled in a ball mill for about 10 hours at 70° F.:

Polystyrene (average molecular weight about 100,000) _____ 5
Methyl ethyl ketone _____ 240
and
"United 5" channel black (of United Carbon Co.) __ 13

By that time the carbon black adsorbed a mono-layer of polystyrene and the dispersion obtained a smooth texture free from graininess (as noted by the customary bar test).

EXAMPLE 2

The following ingredients were processed in the same way as in Example 1 with the same dispersion texture results:

Poly-(methyl methacrylate) resin #2041 (of E. I. du Pont de Nemours) _____ 7
Methyl ethyl ketone _____ 240
and
"Vulcan C" furnace carbon black (of Cabot Corp.) _____ 11

EXAMPLE 3

The following were processed in the same way as in Example 1 with the same dispersion texture results:

Styrene methyl methacrylate copolymer ("Zealin 150" of Dow Chemical Co.) _____ 3
Methyl ethyl ketone _____ 240
and
Channel black ("United EPC" of United Carbon Co.) _____ 12

EXAMPLE 4

The following ingredients were processed in the same way as in Example 1 with the same dispersion texture results:

Polyvinyl acetate VYAF (of Union Carbide Corp.) _ 2
Methyl ethyl ketone _____ 240
and
Furnace black, ("Elftex 5" of Cabot Corp.) _____ 12

EXAMPLE 5

The following ingredients also were processed as in Example 1 with the same dispersion texture results:

Vinyl chloride-acetate copolymer VYHH (of Union Carbide Corp.) _____ 5
Methyl ethyl ketone _____ 240
and
"United 5" channel black _____ 12

Other mono-layer-resin (adsorbate)-coated carbon black dispersions can be prepared by replacing in part or as a whole the specific resin used in any of the separate Examples 1 through 5 by some other suitable resin or elastomer, or only in part by some other adsorbate soluble in the solvent thereof or other suitable solvent. Such other resin or other adsorbate can be any of those, or any of the types, disclosed elsewhere herein and should be compatible with the ingredients of the film-forming resin solution and for the properties to be imparted to and manifested by the continuity-structure-providing of the finished dried electric-signal-responsive film coating or layer.

The (a) generally clear continuity-structure-providing resin solution of stage two, and the (b) finished carbon black-containing coating or electric-signal-responsive film-providing suspension resulting from admixing the stage one carbon black dispersion with the stage two clear resin solution are illustrated respectively by, but not restricted to, the following (wherein the numerical parts are by weight):

EXAMPLE 6

Stage two clear resin solution: 75 parts of vinyl chloride-acetate copolymer VYHH (of Union Carbide Corp.) were milled in a ball mill for about 5 minutes. Then there were added to it the indicated parts of the following ingredients:

Dioctyl phthalate (plasticizer) _____ 20
Calcium-2-ethylacetoacetate acetate (stabilizer of Union Carbide Corp.) _____ 1
Methyl ethyl ketone _____ 560
and
Methyl isobutyl ketone _____ 200

Rotation of the ball mill then was continued, and its contents heated to about 80° F., until a smooth, i.e. graininess free, solution with the stabilizer well dispersed in it was obtained in about 6 hours of milling.

EXAMPLE 7

Clear resin solution of vinylidene chloride-acrylonitrile copolymer: 75 parts of vinylidene chloride-acrylonitrile copolymer ("Saran F 120" of Dow Chemical Co.) were rotated in a ball mill as in Example 6. To it were added the indicated parts of the following agents and the process continued as in Example 6:

Dioctyl phthalate (plasticizer) _____ 25
Calcium-2-ethylacetoacetate acetate (stabilizer) ___ 1
Methyl ethyl ketone _____ 700
and
Methyl ethyl butyl ketone _____ 200

EXAMPLE 8

Clear styrene-butadiene copolymer resin solution: 75 parts of styrene-butadiene copolymer ("Styron 475" of Dow Chemical Co.) were rotated in a ball mill as in Example 6. To it then were added the indicated parts of the following ingredients:

Dioctyl phthalate (plasticizer) _____ 35
Calcium-2-ethylacetoacetate acetate (stabilizer) ____ 1
Methyl ethyl ketone _____ 700
and
Methyl isobutyl ketone _____ 200 and their treatment was carried out as in Example 6 to provide still another example of the stage two continuity-structure-providing resin solution.

Other clear suspending or flexible film-forming resin solutions can be made by one of ordinary skill in this art by making suitable compatible modifications or additions in any of Examples 6 to 8 or in any others like them formulated with any of the other resins disclosed earlier above or in the prior art for a flexible film-forming resin solution for use in preparing an electric-signal-responsive film for the same kind of end product.

EXAMPLE 9

Electric-signal-responsive film-providing suspension (from Examples 5 and 6): The fluid mono-layer-resin-coated carbon black dispersion of Example 5 was added to the contents of the ball mill in Example 6, and rotation of it was continued until a uniform electric-signal-responsive film-providing dispersion was obtained in about 10 minutes.

Other electric-signal-responsive film-providing suspensions are prepared by similarly ball-mill-admixing the mono-layer-adsorbate-coated carbon black dispersion of any of Examples 1 through 5 and any of the indicated possible modifications of any of them with any of the clear suspending or flexible-film-forming resin solutions of Examples 6 to 8 and any of the indicated possible modifications of any of them.

Recording items such as recording blanks, stencils, printing screens, and the like prepared from the suspensions of the invention are illustrated by, but not limited to, the following examples of stencils provided by the suspensions of the invention:

EXAMPLE 10

Stencil with an electric-signal-responsive layer prepared from Example 9 suspension: The finished carbon black containing electric-signal-responsive film-providing suspension of Example 9 was applied in a manner as described in U.S. Pat. 2,664,043 over a first conducting film formed on a belt or carrier and similar to that disclosed in Example 4A of that patent, to provide a combined single or unitary film having a graded resistance. Such combined unitary film thus made with the finished carbon black-containing suspension hereof should have a dry thickness of about 0.0005 to about 0.002 inch and a surface resistance, determined as there described, of from about 1000 to about 5,000,000 ohms.

If desired, a masking coating such as that of Example 2 of Pat. 2,664,043 can be applied over this combined unitary conducting film. Then the overall thickness of the masking coating together with said combined unitary coating beneficially should not exceed 0.006 inch and advantageously be between about 0.001 and about 0.003 inch.

Comparison of stencil of Example 10 suspension and prior art stencil: A stencil of the type shown in FIG. 8 of Pat. 2,664,043 and made as described in it was recorded on a facsimile machine using 300 volts on the stylus and at a speed of 50 inches per second with a line feed of 200 lines per inch. The recorded stencil so produced had an open area of 15% and showed a 70% reduction of tensile strength.

Then a similar stencil but prepared as in this Example 10 by using the finished blended suspension of Example 9 above was recorded on the same facsimile machine with the same voltage on the stylus and same line feed but at 100 inches per second. This so produced recorded stencil showed an open area of 20% but with only a 50% reduction in tensile strength; thereby demonstrating the marked, significantly enhanced properties of the coating films prepared from the two-stage suspension of this invention, as well as those of the resulting products such as recording stencils and the like produced with such a coating or layer.

That the greatly enhanced recording characteristics provided to such recording blank products as recording sheets, stencils, unsupported films, and the like appear to be identified with the type of resin adsorbed as mono-layer on the carbon black is shown by the following:

EXAMPLE 11

Stencil with electric-signal-responsive film-providing suspension (of Examples 1 and 6 products admixed): A stencil as described in Example 10 but by using a continuity-structure-providing suspension prepared by admixing the mono-layer-resin-coated carbon black dispersion of Example 1 with the stage two clear resin solution of Example 6 was recorded on a facsimile machine as described in Example 10 at a recording speed of 100 inches per second. The thus produced recorded stencil had an open area of 30% with only a 50% reduction in tensile strength.

The latter stencil with 30% open area and only 50% tensile strength reduction shows that use of polystyrene (100,000 average mol. wt.) as the mono-layer adsorbate on "United 5" channel carbon black as in Example 1, enables producing a stencil superior to that of Example 10, in producing which the vinyl chloride-acetate copolymer VYHH was the mono-layer adsorbate on the same channel black as in Example 5.

Both of the Examples 10 and 11 stencils were made with the same stage two clear resin solution of Example 6. While the Example 10 stencil is not as good as that of Example 11, it surpasses the one obtained by using a carbon black suspension prepared by the prior art bulk milling process as discussed in the comparison following Example 10.

Other stencils can be made by replacing the suspension used in Examples 10 and 11 similarly by any of the other electric-signal-responsive film-providing suspensions prepared according to the contents of the paragraph immediately following the first paragraph of Example 9. All of those different stencils are included herein as if their preparation was fully recited herein.

So also, other recording blanks such as recording sheets are made by art disclosed procedures from all of the hereinabove in any manner described electric-signal-responsive film-providing suspensions. Such recording sheets thus are included herein by reference as if their preparation was fully recited herein.

Likewise, printing screens are prepared by laying their foraminous structures of any of the materials suitable for them in a layer of any of the anywise herein described electric-signal-responsive film-providing suspensions, for example, by procedures known from the fabric coating art, and allowing the solvent content of the suspension to evaporate off.

All such resulting printing screens thereby having their pores laid in with an electric-signal-responsive film of this invention, comprising the mono-layer-adsorbate-coated carbon black incorporated therein are thus likewise included herein by reference as if the details of their preparation were recited in full herein.

While the invention has been explained by detailed description of certain specific embodiments of it, it is understood that various modifications and substitutions can be made in any of them within the scope of the appended claims which are intended also to cover equivalents of the specific embodiments.

What is claimed is:

1. In the method of producing from carbon black particles and a solution of a film-forming resin in a readily volatile solvent therefor an electric-signal-responsive film-producing suspension having carbon black particles dispersed therein to provide the electric-signal-responsiveness of a recording blank obtainable from said suspension, the improvement which enhances the electric-signal-recording characteristics of said recording blank and includes producing a carbon black dispersion as an essential constituent for said film-producing suspension to provide the electric-signal-responsive film of a recording blank, by the combination of steps which comprises (a) milling (i) a quantity of carbon black particles suitable for use for said film, with (ii) a quantity of a solution of an organic resin as an adsorbate for said carbon black in a readily volatile organic solvent for said adsorbate and compatible with the volatile organic solvent to be used to dissolve the continuity-structure-providing resin to be used for forming said film; and (b) continuing said milling until a smooth dispersion of the particles of the carbon black in the solvent is attained and a mono-layer of said adsorbate is adsorbed over the surfaces of said particles; the quantity of said adsorbate in said solution of it being at least sufficient to enable a mono-layer of said adsorbate to be adsorbed on the surfaces of said quantity of carbon black particles, said adsorbate and the readily volatile organic solvent for it being compatible with the film-forming resin and the organic solvent to be used for dissolving it and also with any other constituents to be used therewith in preparing said signal-responsive film; and said adsorbate resin differing from said film-forming resin.

2. The improvement in the method as claimed in claim 1, wherein the adsorbate is at least one volatile organic solvent soluble member of the class consisting of film-forming resins and resin monomers.

3. The improvement in the method as claimed in claim 2, wherein said adsorbate consists essentially of a film-forming resin.

4. The improvement in the method as claimed in claim 3, wherein said film-forming resin is a member of the class consisting of vinyl chloride polymers and copolymers, polyvinyl resins, vinyl chloride-acetate copolymers, vinylidene chloride polymers and copolymers, styrene polymers and copolymers, polycarbonates, polysulfonates, and high strength elastomers.

5. The improvement in the method as claimed in claim 3, wherein the adsorbate resin consists essentially of polystyrene.

6. The improvement in the method as claimed in claim 3, wherein the adsorbate resin consists essentially of poly-(methyl methacrylate).

7. The improvement in the method as claimed in claim 3, wherein the adsorbate resin consists essentially of polystyrene and poly-(methyl methacrylate).

8. The improvement in the method as claimed in claim 3, wherein said adsorbate consists essentially of said resin and a plasticizer for it.

9. A carbon black dispersion for admixture with a solution of a film-forming resin in a readily volatile solvent for it in preparing the electric-signal-responsive film for a recording blank, which dispersion comprises carbon black particles suitable for use in said film and having absorbed on their surfaces a mono-layer of an organic resin as an adsorbate which prior to its being so adsorbed was dissolved in a readily volatile organic solvent for it, said adsorbate-coated carbon black particles being dispersed in said solvent which solvent as well as said adsorbate is compatible with (a) the solvent for said film-forming resin to be used in providing said film, and (b) said film-forming resin and any other constituents to be used for it; and said adsorbate differing from said film-forming resin.

10. A carbon black dispersion as claimed in claim 9, wherein said adsorbate is at least one volatile organic-solvent-soluble film-forming resin.

11. The dispersion as claimed in claim 10, wherein said adsorbate consists essentially of a film-forming resin.

12. The dispersion as claimed in claim 11, wherein said film-forming resin adsorbate consists essentially of polystyrene.

13. The dispersion as claimed in claim 11, wherein said film-forming resin adsorbate consists essentially of poly-(methyl methacrylate).

14. The dispersion as claimed in claim 11, wherein said film-forming resin adsorbate consists essentially of polystyrene and poly-(methyl methacrylate).

15. An electric-signal-responsive film-producing suspension comprising an admixture of a carbon black dispersion as claimed in claim 14 and a solution of a continuity-structure-providing film-forming resin, effective for forming the electric-signal-responsive film for a recording blank, in a volatile organic solvent for said film-forming resin and compatible with the liquid phase of said dispersion; said film-forming resin differing from the resin adsorbate on the carbon black particles.

16. A film-forming suspension as claimed in claim 15, wherein said film-forming resin is a member of the class consisting of vinyl chloride polymers and copolymers, polyvinyl resins, vinyl chloride-acetate copolymers, vinylidene chloride polymers and copolymers, styrene polymers and copolymers, polycarbonates, polysulfonates, and high strength elastomers.

17. A film-forming suspension as claimed in claim 16, wherein said film-forming resin is a methacrylate polymer or copolymer or mixtures thereof.

References Cited

UNITED STATES PATENTS

| | | | |
|---|---|---|---|
| 1,963,896 | 6/1934 | Gardner | 106—307 |
| 1,999,573 | 4/1935 | Odell | 106—307 |
| 2,350,846 | 6/1944 | Vogel et al. | 106—307 |
| 2,868,662 | 1/1959 | Inghain et al. | 106—198 |
| 2,875,076 | 2/1959 | Suchow | 260—41 R |
| 3,198,647 | 8/1965 | Kress | 106—308 |
| 3,203,922 | 8/1965 | Hanmer | 106—307 |

FOREIGN PATENTS

| | | | |
|---|---|---|---|
| 100,3388 | 2/1937 | Australia | 106—307 |

DOUGLAS J. DRUMMOND, Primary Examiner

U.S. Cl. X.R.

260—41 R; 106—307

UNITED STATES PATENT OFFICE
CERTIFICATE OF CORRECTION

Patent No. 3,652,461    Dated March 28, 1972

Inventor(s) HAROLD R. DALTON

It is certified that error appears in the above-identified patent and that said Letters Patent are hereby corrected as shown below:

Column 1, line 23, after "with" should read -- the --; column 2, line 34, "of" should read -- in --; column 4, line 4, "back" should read -- black --; column 11, line 28, "absorbed" should read -- adsorbed --; column 12, line 39, "100,3388", (Australian reference), should read -- 100,388 --.

Signed and sealed this 1st day of May 1973.

(SEAL)
Attest:

EDWARD M. FLETCHER, JR.　　　　　　　ROBERT GOTTSCHALK
Attesting Officer　　　　　　　　　　Commissioner of Patents